United States Patent [19]

Hashimoto et al.

[11] Patent Number: 4,773,379
[45] Date of Patent: Sep. 27, 1988

[54] APPARATUS FOR CONTROLLING PRESSURE-ACTIVATED ACTUATOR, AND APPARATUS FOR CONTROLLING EXHAUST-GAS RECIRCULATION

[75] Inventors: Mitsuo Hashimoto, Kusatsu; Akira Demizu, Tatsuno, both of Japan

[73] Assignees: Mitsubishi Jidosha Kogyo Kabushiki Kaisha; Mitsubishi Denki Kabushiki Kaisha, both of Tokyo, Japan

[21] Appl. No.: 39,082

[22] Filed: Apr. 16, 1987

[30] Foreign Application Priority Data

Apr. 18, 1986 [JP] Japan .................................. 61-90689

[51] Int. Cl.$^4$ ........................................... F02M 25/06
[52] U.S. Cl. ..................................... 123/571; 123/569
[58] Field of Search ......................... 123/568, 569, 571

[56] References Cited

U.S. PATENT DOCUMENTS

| | | | |
|---|---|---|---|
| 4,325,347 | 4/1982 | Yamaguchi | 123/571 |
| 4,378,776 | 4/1983 | Nishimori | 123/571 |
| 4,428,355 | 1/1984 | Yokooku | 123/571 |
| 4,448,177 | 5/1984 | Hasegawa et al. | 123/571 |
| 4,528,968 | 7/1985 | Otobe | 123/571 |
| 4,534,334 | 8/1985 | Murakami et al. | 123/571 |

FOREIGN PATENT DOCUMENTS

0002459 1/1983 Japan .

Primary Examiner—Willis R. Wolfe
Attorney, Agent, or Firm—Hedman, Gibson, Costigan & Hoare

[57] ABSTRACT

An apparatus for controlling the exhaust-gas recirculation cycling of an engine includes an exhaust-gas recirculation passage connected at one end to an intake passage and at the other end to an exhaust passage. An exhaust-gas recirculation valve is provided in the recirculation passage to open and close it. The valve is coupled to an actuator having a pressure chamber and moved in accordance with the pressure within the chamber. The chamber communicates with first and second pressure sources through a solenoid valve. In order to move the recirculation valve to a desired position from the present position, the solenoid valve is controlled by a control device such that the first and second pressure sources are alternately connected to the pressure chamber when the distance between the present and desired positions is small, and such that the first or second pressure source is continuously connected to the pressure chamber when the distance between the present and desired positions is large.

5 Claims, 6 Drawing Sheets

APPARATUS FOR CONTROLLING PRESSURE-ACTIVATED ACTUATOR, AND APPARATUS FOR CONTROLLING EXHAUST-GAS RECIRCULATION

BACKGROUND OF THE INVENTION

The present invention relates to an apparatus for controlling a pressure-activated actuator, and also to an apparatus for controlling the recirculation of engine exhaust gas.

A pressure-activated actuator has a pressure chamber and a movable partition provided in the pressure chamber and dividing the chamber into two chambers. The partition moves when the pressure within the pressure chamber changes. When the partition moves this way, the actuator drives a device coupled to it. Among the devices which can be driven by the pressure-activated actuator is an EGR (Exhaust-Gas Recirculation) control valve. The EGR control valve is usually actuated by a pressure-adjusting valve which in turn is controlled by a computer.

Figure 7:
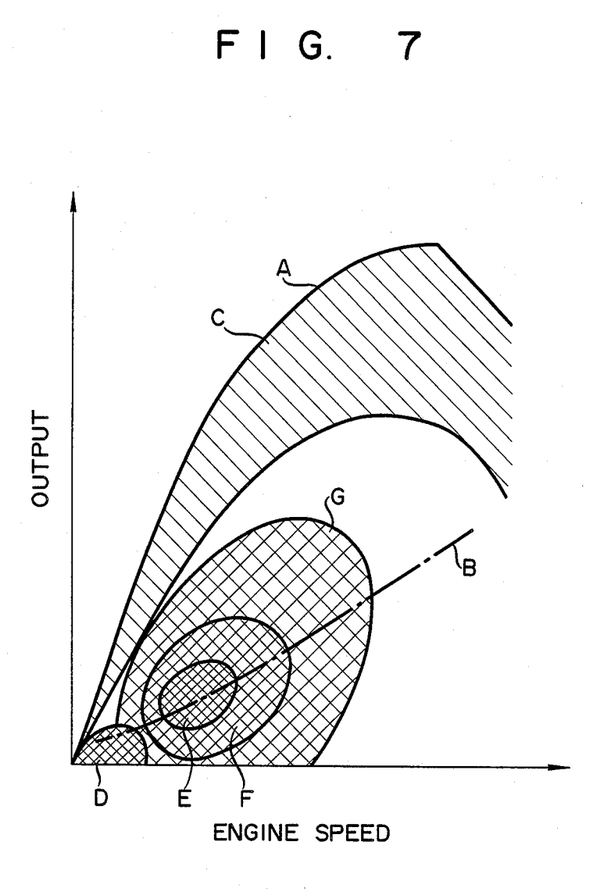
FIG. 7 is a graph representing the relationship between the output of the diesel engine and the EGR ratio.

While a diesel engine is operating, air is always supplied to the engine in excess. The ratio of the supplied air to the amount of air required by the engine, i.e., the excess-air ratio, depends on the speed at which the diesel engine is rotating. The excess-air ratio is great in the low-load side of the engine. Therefore, the amount of NOx in the low-load side cannot be sufficiently reduced unless the exhaust-gas recirculation is controlled to a greater degree than in the high-load side of the diesen engine. In FIG. 7 attached hereto, curve A shows the relationship between the output and speed of the diesel engine, curve B represents the relationship between the road-load on the engine and the speed thereof, and region C (a shaded area) indicates the region in which the EGR control cannot be effective. The exhaust-gas recirculation is controlled such that air is supplied to the diesel engine with excess-air ratio λ of 50% to 70% when the engine operates in idling region D or region E. In region E, the engine is driving wheels at an automobile speed of about 40 km/h. As is shown in FIG. 7, region F in which the excess-air ratio is $\lambda_2$, which is less than ratio $\lambda_1$, surrounds region E, and region G in which the excess-air ration is $\lambda_3$, which is less than ratio $\lambda$, surrounds region F. When the driver quickly and deeply depresses the accelerator pedal in order to raise the automobile speed from 40 km/h, the amount of injected fuel is increased and the diesel engine abruptly goes into region C, before the engine speed raises. Consequently, the exhaust-gas recirculation can no longer be controlled. In order to prevent the engine from belching black smoke, it is necessary to lower the EGR control. In other words, the exhaust-gas recirculation must be controlled whenever the operating condition of the engine changes There are two methods of electronically controlling the exhaust-gas recirculation, i.e., feedback control and duty control. The feedback control uses an EGR valve equipped with a potentiometer. The potentiometer detects the distance the valve actually moves to control the exhaust-gas recirculation. If this distance is different from the distance for which the valve should move to achieve an optimum EGR control, the signal representing the difference is fed back to the valve, thereby to control the pressure within the EGR valve. The duty control consists in periodically opening the EGR valve to the atmosphere. That is, a duty control is performed to automatically change the pressure within the EGR valve to a desired valve.

The feedback control is disadvantageous in the following respects. First, the system for achieving this control is expensive. Secondly, the actuator used in this control, and/or the EGR valve driven by the actuator has an insufficient durability. The duty control has also some drawbacks. First, the response of the EGR valve is poor since the valve must be repeatedly opened to the atmosphere, and a pressure must be applied into the EGR valve. Secondly, the ERG valve causes ripples, inevitably reducing the durability of the valve and greatly changing the pressure within the valve. In order to minimize the changes in this pressure, the diameter of a throttle provided between the opening of the valve connecting the atmosphere and the pressure source provided for the EGR valve can be reduced. The measure, if taken, will lower the response of the EGR valve.

SUMMARY OF THE INVENTION

It is accordingly the object of the present invention to provide an apparatus for controlling a pressure-activated actuator with a good response, and also to provide an apparatus for controlling exhaust-gas recirculation with a good response.

According to the present invention, there is provided an apparatus comprising: a first pressure source for providing a first pressure; a second pressure source for providing a second pressure different from the first pressure; pressure-adjusting means for connecting said first or second pressure source to the pressure chamber; first control means for operating the pressure-adjusting means such that the first and second pressure sources are alternately connected to the pressure chamber, thereby to maintain the pressure within the chamber at a value between the first and second pressures; second control means for controlling said pressure-adjusting means such that said first or second pressure source continuously communicates with the pressure chamber; and selection means for driving said second control means for a period of time determined by the difference between the present value and a desired value set for the pressure within the chamber so as to change the pressure in the chamber to the desired value.

In the present invention, the pressure within the pressure chamber of the actuator is changed from the first value (i.e., the present value) to the second value (i.e., the desired value), which falls between the first value and the second pressure, thereby moving the device from the first position to the second position. The control means supplies the second control signal to the pressure-adjusting valve for the time determined by the difference between the first and second values. During this period of time, the second pressure continuously acts within the pressure chamber, thus changing the pressure within this chamber from the first value toward the value of the second pressure. Then, the control means supplies the first control signal to the pressure-adjusting valve in order to maintain the pressure within the chamber at the second value (i.e., the desired value). As a result, the first and second pressures alternately act within the pressure chamber, whereby the pressure within the chamber is maintained at the second value which falls between the first and second pressures.

DETAILED DESCRIPTION OF THE PREFERRED EMBODIMENT

The present invention will now be described in detail, with reference to an EGR control apparatus for performing a method of controlling a pressure-activated actuator used to control a diesel engine.

Figure 3:
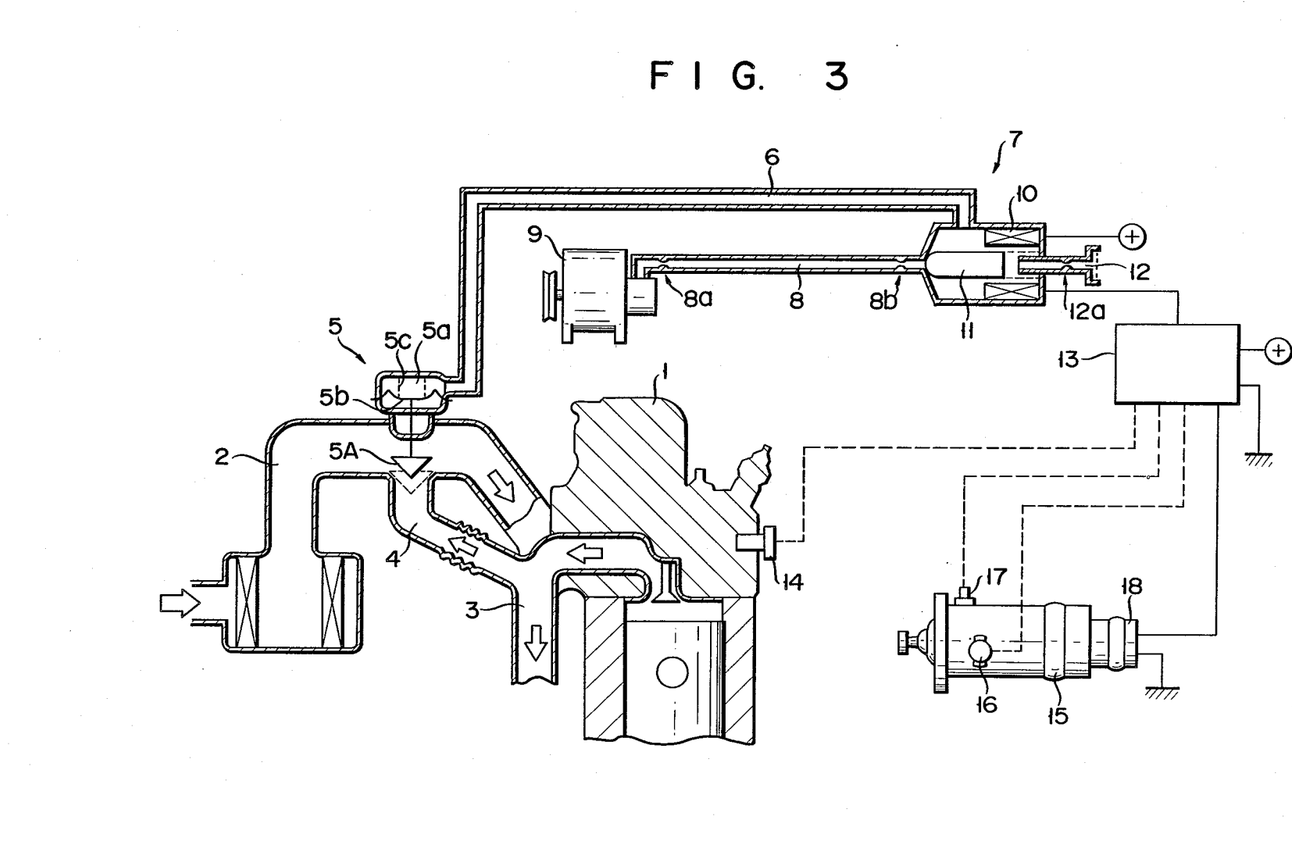
FIG. 3 is a view schematically showing the EGR control apparatus.

As is shown in FIG. 3, EGR duct 4 branching from exhaust manifold 3 of diesel engine 1 is connected to intake manifold 2. EGR duct 4 can be closed and opened by EGR valve 5A which is driven by pressure-activated actuator 5 (hereinafter called "actuator"). Actuator 5 comprises pressure chamber 5a, movable partition 5b, and spring 5c. Partition 5b divides chamber 5a into upper and lower chambers, and can be moved as the pressure in the upper chamber changes. Spring 5c urges the partition in one direction. EGR valve 5A is coupled to movable partition 5b, and urged by spring 5c such that it usually closes EGR duct 4. Pressure chamber 5a is connected by negative pressure output duct 6 to solenoid valve 7 which functions as a pressure-adjusting valve. Solenoid valve 7 is coupled by negative pressure duct 8 to vacuum pump 9. Duct 8 functions as a second pressure-applying duct. Vacuum pump 9 functions as a second pressure source for generating a second pressure, i.e., a negative pressure. Orifice 8a having an inner diameter of 0.9 mm, and orifice 8b having an inner diameter of 0.6 mm are provided within negative pressure duct 8.

Solenoid valve 7 comprises coil 10 and valve body 11 which can be moved by coil 10. Air duct 12 is connected at one end to solenoid valve 7. The other end of air duct 12 is open to the atmosphere, which is used as a first pressure source for providing a first pressure, i.e., atmospheric pressure. Orifice 12a having an inner diameter of 0.6 mm is provided in air duct 12. When solenoid 7 is driven, as will later be described in detail, and its valve body 11 closes negative duct 8, negative pressure output duct 6 communicates with air duct 12. As a result, the pressure within chamber 5a of actuator 5 changes to atmospheric pressure, whereby EGR valve 5A moves to the position represented by a broken line (FIG. 3) and closes EGR duct 4. On the other hand, when solenoid 7 is driven, and valve body 11 thereby closes air duct 12, the negative pressure generated by vacuum pump 9 is supplied to pressure chamber 5a of actuator 5. In this case, EGR valve 5A is moved to the position represented by a solid line (FIG. 3) and opens EGR duct 4. Moreover, solenoid valve 7 can be duty-controlled, as will later be explained, to intermittently supply the negative pressure from vaccum pump 9 to actuator 5.

Solenoid valve 7 is electrically connected to control unit 13 comprised of a computer used as control means. Control unit 13 receives signals from water temperature sensor 14, lever position sensor 16 and rotation sensor 17. The signal supplied from sensor 14 represents the temperature of the engine-cooling water. The signal supplied from sensor 16 shows the position of the lever of fuel injection pump 15. The signal supplied from sensor 17 represents the rotational speed of engine 1. That is, these signals represent the operating conditions of diesel engine 1. Fuel injection pump 15 has timing-control solenoid valve 18. This valve 18 is electrically connected to control unit 13. Control unit 13 supplies first and second control signals to solenoid valve 7. The first control signal causes solenoid valve 7 to operate such that the first pressure (i.e., atmospheric pressure) and the second pressure (i.e., a negative pressure) alternately act in pressure chamber 5a of actuator 5 to maintain the pressure within chamber 5a at a predetermined value between atmospheric pressure and the negative pressure. The second control signal causes solenoid 7 such that the second pressure continuously acts in pressure chamber 5a to change the pressure within chamber 5a from the predetermined value to the second pressure.

Figure 4:
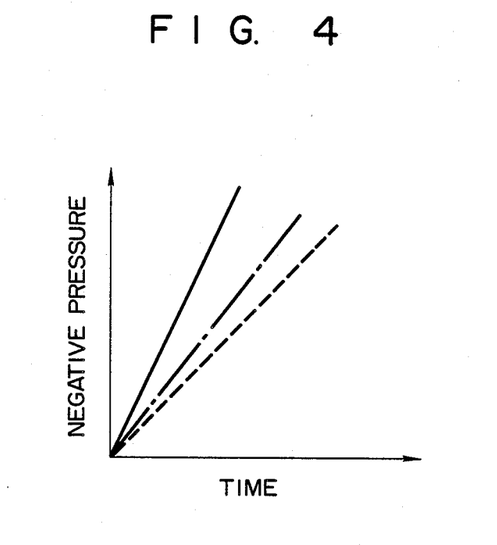
FIG. 4 is a graph showing how the control pressure changes with time when the diameter of a throttle provided in a passage is fixed.

FIG. 4 shows how the negative pressure applied to chamber 5a changes with time when the negative pressure is continuously applied to actuator 5 by closing air duct 12. The solid line in this figure indicates the rate at which the pressure changes when orifice 8b has a diameter of 0.8 mm. The dot-dash line in FIG. 4 shows the rate at which the pressure changes when orifice 8b has a diameter of 0.6 mm. The broken line in FIG. 4 represents the rate at which the pressure changes when orifice 8b has a diameter of 0.5 mm. As can be seen from FIG. 4, the negative pressure supplied to actuator 5 linearly changes with time, provided that the diameter of orifice 8b remains unchanged. It follows that, since the pressure within chamber 5a of actuator 5 is proportional to the time during which valve body 11 of solenoid valve 7 opens negative pressure duct 8, the negative pressure applied to actuator 5 can be controlled by moving valve body 11. Therefore, the rate, at which the pressure applied to actuator 5 changes with time, is stored in control unit 13. Hence, it is possible to predict, from the time during which duct 8 remains open, how the negative pressure changes.

Figure 5:
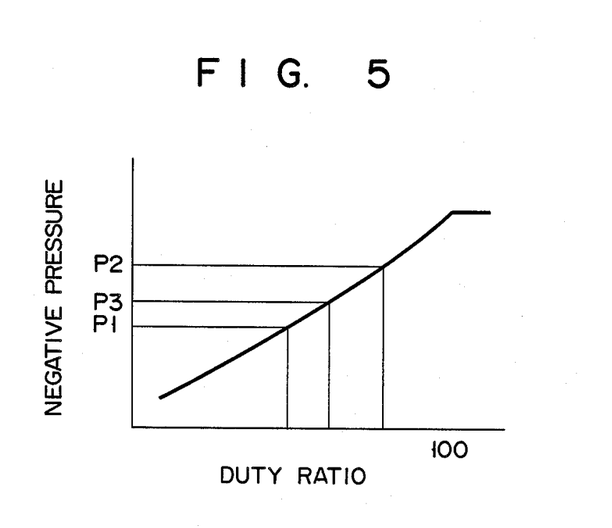
FIG. 5 is a graph illustrating the relationship between the control pressure and the duty ratio.

As is shown in FIG. 5, the duty ratio of actuator 5 is determined by the negative pressure within chamber 5a. In other words, the duty ratio changes when the negative pressure within chamber 5a changes from value P1 to P2.

Figure 1:
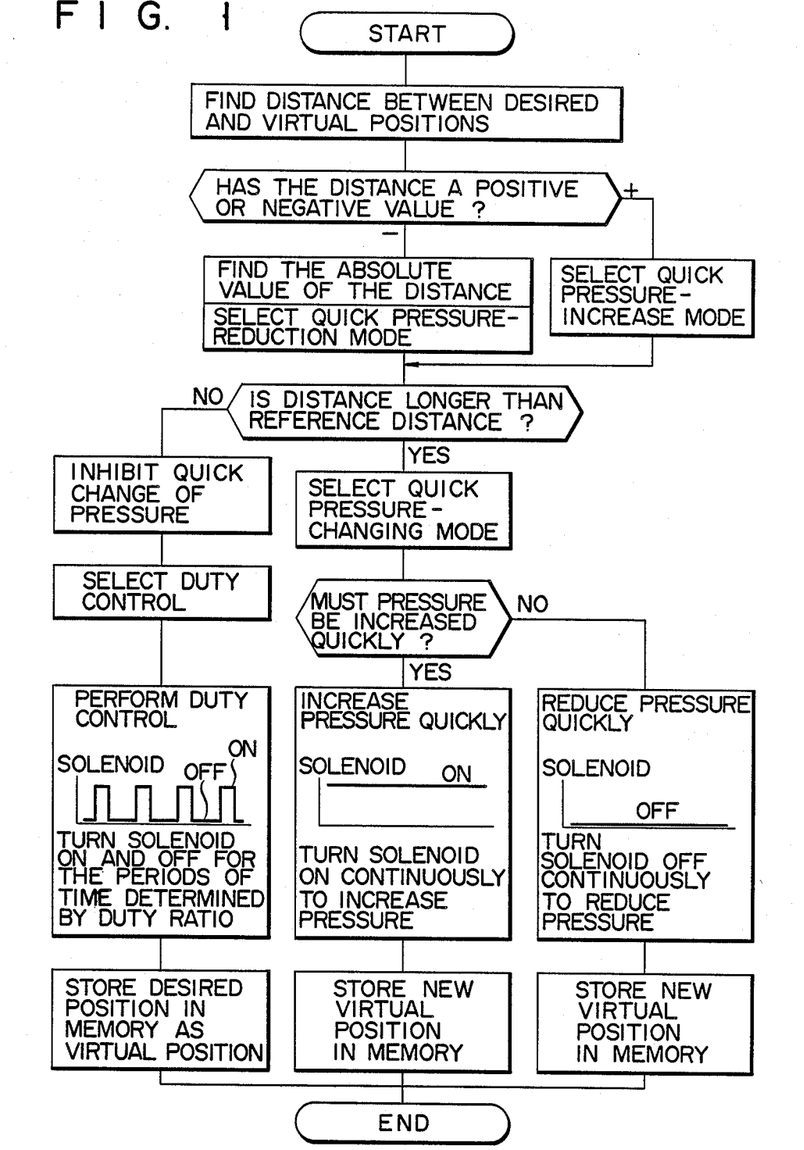
FIG. 1 is a flow chart explaining the operation of an EGR control apparatus of this invention, which is designed for use in controlling a diesel engine.

The operation of the EGR control apparatus will now be explained with reference to FIGS. 1 and 2.

Assume that diesel engine 1 is driven while control pressure P1 is maintained in pressure chamber 5a of actuator 5. Control unit 13 stores the present EGR ratio which represents the present position of EGR valve 5A. (The position of EGR valve 5A will hereinafter be called "virtual position" since EGR valve 5A is continuously moved.) When the accelerator pedal (not shown), which is electrically coupled to control unit 13, is depressed, unit 13 calculates the distance between the virtual position of EGR valve 5A and the desired position corresponding to control pressure P2, from the lever-position signal supplied from sensor 16 and the rotation signal supplied from sensor 17. The data representing this distance is stored in the memory provided in control unit 13. The time, which EGR valve 5A requires to move from the virtual position to the desired position, is found from the distance thus calculated.

Then, it is determined whether or not the distance between the virtual and desired positions takes a positive value or a negative value. If it takes a positive value, control unit 13 temporarily outputs a control signal to quickly increase the control pressure. If it takes a negative value, its absolute value is stored in the memory of unit 13, and the unit temporarily outputs a control signal to quickly reduce the control pressure.

A dead range is set for a desired control pressures P2. This pressure P2 is required to move EGR valve 5A to the desired position. The dead range correspond to a reference distance between the virtual and desired positions of EGR valve 5A. If the distance between these positions is longer than this reference distance, it is necessary to quickly change the control pressure. Hence, it is determined whether or not the distance between the virtual and desired positions of EGR valve 5A corresponds to a control pressure falling within the dead range. If YES, control unit 13 outputs the first signal which inhibits an abrupt change of the control pressure and instructs solenoid valve 7 to perform duty control on actuator 5. More specifically, unit 13 intermittently supplies an electric current to coil 10 of solenoid valve 7. Coil 10 therefore repeatedly moves valve body 11 back and forth. Valve body 11 alternately closes negative pressure duct 8 and air duct 12, and also alternately opens ducts 8 and 12. The negative pressure and atmospheric pressure are alternately applied to pressure chamber 5a of actuator 5 through duct 6. The duty ratio, i.e., the ratio of the time during which coil 10 is energized to the time during which coil 10 is not energized, is determined by the optimum control pressure (i.e., the negative pressure) within chamber 5a, as is clearly shown in FIG. 5. When the pressure within chamber 5a of actuator 5 is changed to the desired value by the operation of solenoid valve 7, it is assumed that EGR valve 5A has moved to the desired position. The new virtual position of valve 5A, which is now identical with the desired position, is stored in the memory of control unit 13.

If the distance between the virtual and desired positions of EGR valve 5A corresponds to a control pressure falling outside the dead range described above, that is, when the EGR valve is located very far from the desired position, control unit 13 outputs the second signal to quickly change the control pressure. Unit 13 then determines whether the control pressure must be quickly increased or not. If YES, control unit 13 turns ON solenoid valve 7 continuously. Valve body 11 of solenoid valve 7 is therefore moved to the right, thus closing air duct 12. As a result, the negative pressure generated by vacuum pump 9 is continuously applied to pressure chamber 5a of actuator 5 through negative pressure output duct 6. EGR valve 5A coupled to movable partition 5b is quickly moved up, thereby opening EGR duct 4. This is because valve body 11 closes air duct, leaving negative pressure duct 8 continuously open, and the control pressure (i.e., the negative pressure) within chamber 5a abruptly increases, from value P1 toward value P2. The control operation is performed at regular time intervals. A desired moving distance previously set in accordance with the moving distance of partition 5b during the time interval is added to the virtual position of valve 5A, and the resultant position is set as a new virtual position. The new virtual position of EGR valve 5A is compared with the desired position, thus finding the distance between the virtual and desired positions. Until this distance becomes equal to the reference distance, the control pressure is increased. When the distance becomes equal to the reference distance, control unit 13 outputs the first control signal, whereby solenoid valve 7 performs the duty control on actuator 5 with the duty ratio determined by desired control pressure P2. As a result, the control pressure reaches the desired value P2. Then, the virtual position of EGR valve 5A, which corresponds to pressure P2, is stored in the memory of control unit 13. The control pressure within chamber 5a remains unchanged until signals representative of the changes in the operating conditions of diesel engine 1 are supplied to control unit 13.

If control unit 13 determines that the control pressure (i.e., the negative pressure) must be quickly reduced, unit 13 supplies the second control signal to solenoid valve 7. Assume that, as is shown in FIG. 2, the control pressure is at value P2 and should be quickly reduced to desired value P3. In this case, the second control signal turns solenoid valve 7 continuously off. That is, valve body 11 is moved to the left (FIG. 3), thus closing negative pressure duct 8 and opening air duct 12. Atmospheric pressure (or, the first pressure) is, therefore, applied to pressure chamber 5a of actuator 5. Hence, the pressure within chamber 5a rapidly rises, thereby quickly moving EGR valve 5A downwardly until valve 5A closes EGR duct 4. In other words, as is shown in FIG. 2, the control pressure (i.e., the negative pressure) is abruptly reduced from value P2 to value P3. The control operation is performed at regular time intervals. A desired moving distance previously set in accordance with the moving distance of partition 5b during the time interval is subtracted from the virtual position of valve 5A, and the resultant position is set as a new virtual position. The new virtual position of EGR valve 5A is compared with the desired position corresponding to desired control pressure P3, thereby finding the distance between the virtual and desired positions. Until this distance becomes equal to the reference distance, the control pressure is reduced. When the distance becomes equal to the reference distance, control unit 13 outputs the first control signal to solenoid valve 7. Solenoid valve 7 thereby stops performing the control for a quick reduction of the control pressure, and starts performing the duty control on actuator 7. The new virtual position of EGR valve 5A, which corresponds to pressure P3, is stored in the memory of control unit 13. The control pressure within chamber 5a remains unchanged, at value P3, until signals representing the changes in the operating conditions of diesel engine 1 are input to control unit 13.

Figure 2:
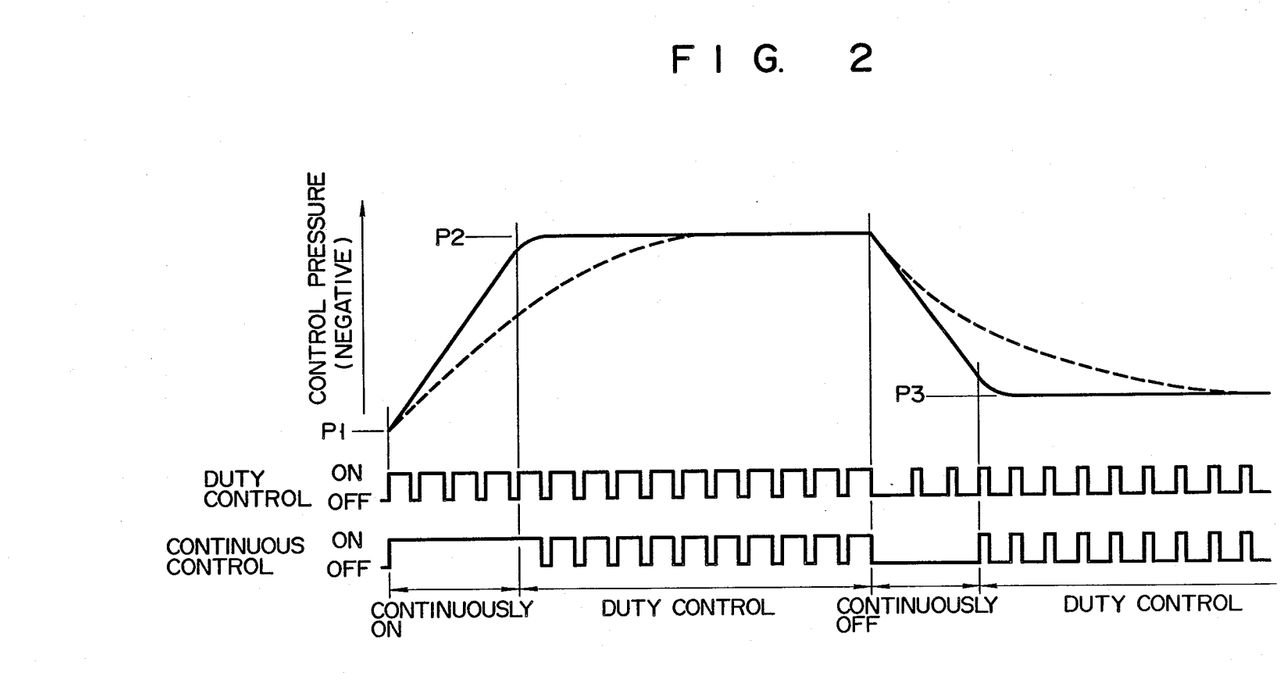
FIG. 2 is a diagram showing how a control pressure changes when the exhaust-gas recirculation is continuously controlled and also how the control pressure changes when the exhaust-gas recirculation is duty-controlled

In FIG. 2, the broken curve shows how the control pressure changes when control unit 13 continuously performs the duty control on actuator 5, carrying out neither the control for a quick reduction of the control pressure, nor the control for a quick increase of the control pressure. As is evident from the broken curve, the response of the EGR control apparatus is poor when only the duty control is performed on actuator 5;

a considerably long time is required to change the control pressure from value P1 to value P2.

Figure 6:
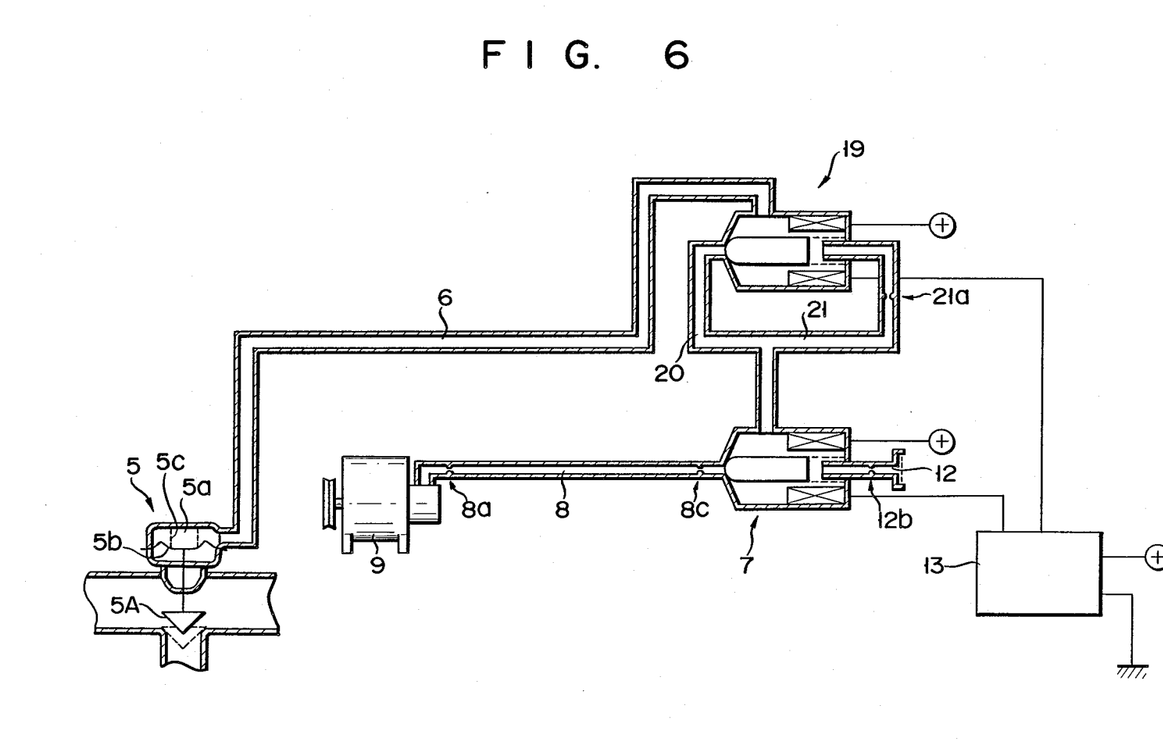
FIG. 6 is a schematic diagram showing the main components of a modification of the EGR control apparatus.

FIG. 6 shows a modification of the EGR control apparatus shown in FIG. 3. This modification is different from the apparatus of FIG. 3 in that a duct-switching solenoid value 19 is provided on negative pressure output duct 6 which connects actuator 5 and solenoid value 7. In this modification, orifice 12b provided within air duct 12 has a diameter of 0.8 mm, and orifice 8c provided within negative pressure duct 8 has a diameter of 0.8 mm. Solenoid valve 7 and duct-switching solenoid valve 19 are connected by high-speed duct 20 and low-speed duct 21. No orifices are provided within high-speed duct 20, whereas orifice 21a having a diameter of 0.5 to 0.6 mm is provided within low-speed duct 21.

Duct-switching solenoid valve 19 is turned on in order to drive actuator 5 such that the control pressure within chamber 5a quickly increases or decreases. When it is turned on, solenoid valve 19 opens high-speed duct 20, thereby connecting pressure chamber 5a and negative pressure duct 8 of vacuum pump 9, or connecting chamber 5a and air duct 12. In order to perform the duty control on actuator 5, duct-switching solenoid valve 19 is turned off, thereby closing high-speed duct 20 and opening low-speed duct 21. Since orifice 21a is provided in low-speed duct 21, the control pressure within chamber 5a changes more slowly than when high-speed duct 20 is opened. This helps to prolong the life of actuator 5 and also the life of EG valve 5A. When high-speed duct 20 is opened, the control pressure within chamber 5a changes quickly since no orifices are provided in duct 20. This serves to improve the response of the EGR control apparatus.

In the present invention, as has been described above, the data representing the rate at which the pressure within the pressure-activated actuator changes, is stored in the control unit. The period of time, which the actuator requires to move a valve from the present position to a desired position, is calculated from this data. The actuator is continuously driven until this period of time expires, thereby moving the valve quickly toward the desired position. Upon expiration of this period, the control is performed on the actuator. Hence, the pressure within the actuator can be quickly changed. Therefore, the present invention can provide a method of controlling a pressure-activated actuator to improve the response thereof.

The present invention is not limited to the EGR control of a diesel engine. It can apply to any other controls using pressure-activated actuators.

What is claimed is:

1. An apparatus for controlling the exhaust-gas recirculation of an engine having an exhaust passage and an intake passage, said apparatus comprising:
    an exhaust-gas recirculation passage connected at one end to the intake passage and at the other end to the exhaust passage, for guiding part of the exhaust gas flowing through the exhaust passage to the intake passage;
    an exhaust-gas recirculation valve having a pressure chamber and a valve body being moved in accordance with the pressure within the chamber, for opening and closing the exhaust-gas recirculation passage;
    first valve means for selectively applying a negative pressure and atmospheric pressure to the pressure chamber, thereby to control the opening of the exhaust-gas recirculation valve means;
    a first duct provided between the first valve means and the pressure chamber;
    a second duct provided in parallel to the first duct and having choke means;
    second valve means for selectively connecting the first and second ducts to the pressure chamber; and
    control means for actuating the second valve means such that the first duct is connected to the pressure chamber in order to change the pressure within the chamber at high speed, and the second duct is connected to the chamber in order to change the pressure within the pressure chamber at low speed.

2. The apparatus according to claim 1 wherein said control means includes first means for operating the first valve means such that said negative and atmospheric pressures are alternately applied to the pressure chamber, thereby to maintain the pressure within the chamber at a predetermined value; second means for operating the first valve such that said negative or atmospheric pressure is continuously applied to the pressure chamber; and selection means for driving the second means for a period of time determined by the difference between the present opening of the exhaust-gas recirculation valve and a desired opening thereof so as to change the opening to the desired value.

3. An apparatus for controlling a pressure-activated actuator having a pressure chamber and a partition dividing the pressure chamber into two sections and being able to move as the pressure within the chamber changes, to thereby actuate an exhaust-gas recirculation valve of an engine, said apparatus comprising:
    a pressure source for supplying to the pressure chamber a first pressure or a second pressure differing from the first pressure;
    a pressure-adjusting valve for adjusting the pressure in the pressure chamber, by controlling the supply of the first and second pressures to the pressure chamber;
    means for determining a target pressure in the pressure chamber which is suitable for operating the engine;
    memory means for storing the data corresponding to the virtual present pressure in said pressure chamber;
    comparing means for comparing the target pressure and the virtual present pressure and including means for outputting a signal corresponding to the difference in pressure between the target prfessure and the virtual present pressure;
    first control means for controlling said pressure-adjusting valve when said pressure difference is out of a predetermined range, such that the first or second pressure is continuously applied to the pressure chamber in accordance with whether the pressure difference is negative or positive, to thereby change the virtual present pressure toward the target pressure;
    means for determining a new virtual present pressure, in accordance with the time period in which the first or second pressure is continuously applied by the first control means to said pressure chamber, and in accordance with the choice between the first pressure and the second pressure supplied to said pressure chamber; and
    second control means for controlling the pressure-adjusting valve when said pressure difference is within the predetermined range, in accordance with a pulse signal representative of the duty for obtaining said target pressure, such that the first and second pressures are alternately applied to the pressure chamber, to thereby change the pressure in the pressure chamber toward the target pressure.

4. The apparatus according to claim 3, wherein said means for determining a new virtual present pressure includes means for replacing the data corresponding to the virtual present pressure stored in said memory means with the data corresponding to the new virtual present pressure, when said pressure difference is within the predetermined range.

5. The apparatus according to claim 3, wherein said pressure-adjusting valve comprises first valve means provided between the pressure chamber and the first and second pressure sources, for selectively connecting the first and second pressure sources to the pressure chamber, a first duct provided between the first valve means and the pressure chamber, a second duct provided parallel to the first duct and having throttle means, and second valve means provided between the pressure chamber and the first and second ducts, for selectively connecting the first and second ducts to the pressure chamber, said valve means adapted to apply a pressure through said second duct to the pressure chamber when the first control means operates.

* * * * *